United States Patent [19]

Weiss

[11] Patent Number: 4,469,478

[45] Date of Patent: Sep. 4, 1984

[54] SHIFT MECHANISM FOR BICYCLES

[76] Inventor: Thomas J. Weiss, 12824 Opalocka Dr., Chesterland, Ohio 44026

[21] Appl. No.: 312,720

[22] Filed: Oct. 19, 1981

[51] Int. Cl.³ .................. F16H 11/00; B60K 20/02
[52] U.S. Cl. ............................ 474/80; 280/238; 74/474
[58] Field of Search ............. 474/80, 82; 74/474, 74/436; 280/236, 238, 261

[56] References Cited

U.S. PATENT DOCUMENTS

| Re. 30,758 | 10/1981 | Lang | 474/80 |
| 3,613,466 | 6/1970 | Houghton | 474/80 |
| 3,827,312 | 8/1974 | Bristol et al. | 74/436 |

FOREIGN PATENT DOCUMENTS 519864  2/1931  Fed. Rep. of Germany ........ 474/80

Primary Examiner—John E. Murtagh
Assistant Examiner—Andrew Joseph Rudy
Attorney, Agent, or Firm—James A. Hudak

[57] ABSTRACT

A foot-operated mechanism (24) for actuating the rear derailleur (20) of a bicycle. The mechanism senses tension in the drive chain (22) and effects movement of the derailleur actuating cable (74) when driving tension is reduced from the drive chain (22). The actual shift of the derailleur occurs only upon reestablishment of tension in the drive chain (22) by applying a driving force to the pedals. The derailleur cable is connected, through a transfer mechanism (30), to a slotted driven wheel (42) which is normally biased into engagement with drive pins (64a) located on a drive wheel (26) which is attached to the crank mechanism (18) of the bicycle, and is moved out of engagement by a chain-engaging idler sprocket (50) attached to a pivot block (38) on which the driven wheel (42) is mounted.

13 Claims, 5 Drawing Figures

SHIFT MECHANISM FOR BICYCLES

TECHNICAL FIELD

The present invention relates generally to a shift mechanism for a bicycle, and more particularly to a foot-controlled mechanism for controlling the shifting of a derailleur type speed change mechanism.

BACKGROUND ART

The 10-speed bicycle is one of the most popular types in use today. It incorporates a set of five chain sprockets attached to the rear wheel and a pair of sprockets on the pedals, with a drive chain moved from one sprocket to another by means of a mechanism called a derailleur. Other similar types provide five speeds using a rear derailleur only; and twelve, fifteen, eighteen or twenty-one speeds using combinations of front and rear derailleurs. Of these, however, the ten speed is by far the most popular.

The derailleur mechanisms are controlled by cables actuated by control levers located within easy reach of the rider, and a speed change is effected by moving a control lever while continuing to pedal, causing the chain to be guided onto the desired sprocket by derailleur mechanism.

The process of making speed changes efficiently requires skill and patience, as the rider must remove his hand from the handlebar, move the lever, wait until the shift has been made, and then move the lever to a neutral position so that the chain does not rub the side of an adjacent sprocket. For an average rider this shifting process is complicated and annoying, and as a result he does not attempt to master the skill required to use all the speeds available. The average ten-speed bicycle is thus ridden like a five speed, with essentially all the shifting being done by the rear derailleur, and the front derailleur is shifted only when a hill is encountered. Accordingly, for an average rider it would be desirable to have a means for automatically shifting the rear derailleur so that only the front derailleur need be shifted in a conventional manner for hill climbing or descending.

Prior art attempts to provide automatic shifting of the rear derailleur have included devices which move the rear derailleur in response to changes in pedal pressure as sensed by the tension in the drive chain. Such prior art devices are generally complex and are designed so that the speed change takes place with varying degrees of pedal pressure, i.e., heavy pressure for shifting to lower gears and light pressure for shifting to higher gears. Shifting under heavy pedal pressure can cause damage to the chain and sprocket. In addition, unless a constant pedal pressure is maintained when no shift is desired, the device can cause unwanted gear changes. In actual use it is all but impossible for an average rider to maintain such constant pedal pressure, and such devices have not found wide acceptance.

Another drawback of prior art automatic shifting devices is that they do not prevail the rider to shift to a lower speed as the bike is coasting to a stop in anticipation of starting from a stop in a lower gear, which can be done with a conventional derailleur mechanism.

Because of the foregoing, it has now become desirable to develop a simple, foot-controlled shifting mechanism which can be adapted to any bicycle equipped with a derailleur speed change mechanism, to automatically effect a speed change when desired by the rider.

SUMMARY OF THE INVENTION

The present invention solves the aforementioned problems associated with the prior art as well as other problems by providing a shifting mechanism which is positioned to effect a shift when pedal pressure is reduced. The operation of the shifting mechanism is dependent on the slackening of the drive chain resulting from the loss of pedal pressure to move a gear change mechanism into position to engage drive means mounted on a the pedal crank. Thereafter renewed pedaling in the forward direction effects a shift into a high gear, while pedaling in the reverse direction for a fraction of a revolution followed by forward pedaling effects a shift into a lower gear.

More specifically, an idler sprocket rides on top of the drive chain to sense tension in the chain. The idler sprocket is mounted on a pivot block which also has a gear-like driven wheel mounted thereon. The driven wheel has slots formed in it which are engageable by pins received in a drive wheel mounted on the pedal crank. The pivot block is normally spring-biased to maintain the driven wheel in engagement with the drive wheel, and is kept out of engagement with the drive wheel by chain tension acting on the idler sprocket. When a shift to a higher speed is desired, the pedal pressure is reduced permitting a drive pin to engage a slot in the driven wheel when the driven wheel moves into engagement with the drive wheel. Forward pedaling then causes the drive pin to move the driven wheel in a clockwise direction whereupon a chain or cable mechanism operably attached to the driven wheel effects movement of the rear derailleur in a direction effecting a shift to a higher speed. For shifts to a lower speed, the pedals are stopped, moved backward a fraction of a turn to rotate the driven wheel counterclockwise and move the derailleur to a lower speed position. In either case, the shift is made only after forward pedaling is continued whereupon tension is restored in the drive chain to move the driven wheel back out of engagement with the drive wheel.

DESCRIPTION OF THE PREFERRED EMBODIMENT

Figure 1:
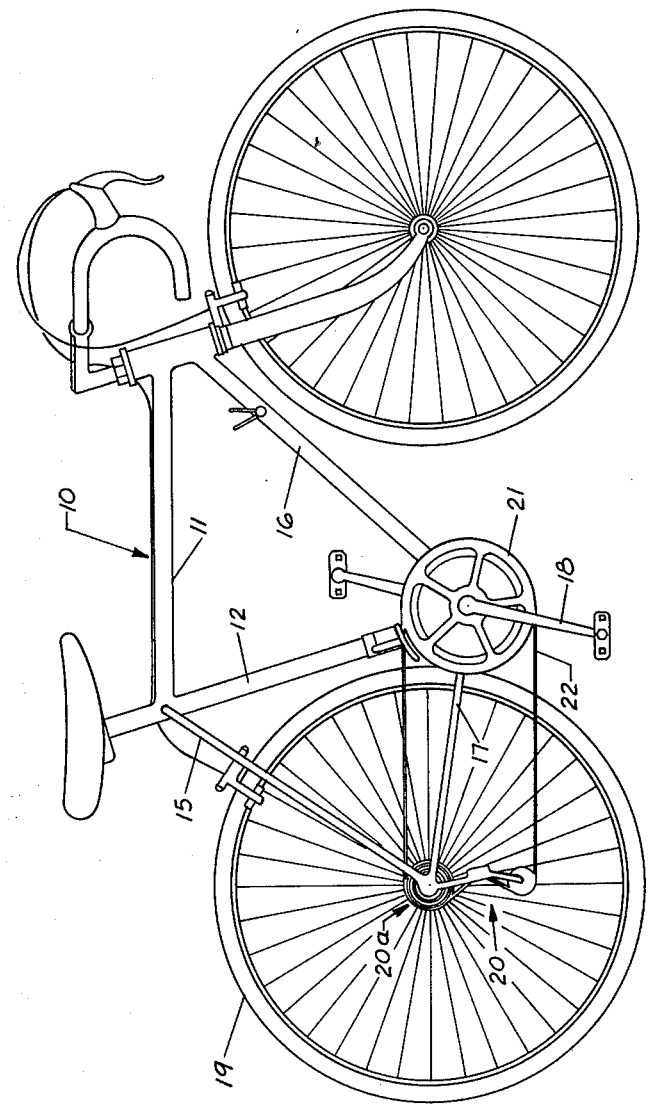
FIG. 1 is a side elevation view of a typical bicycle incorporating a derailleur type speed change mechanism.
Figure 2:
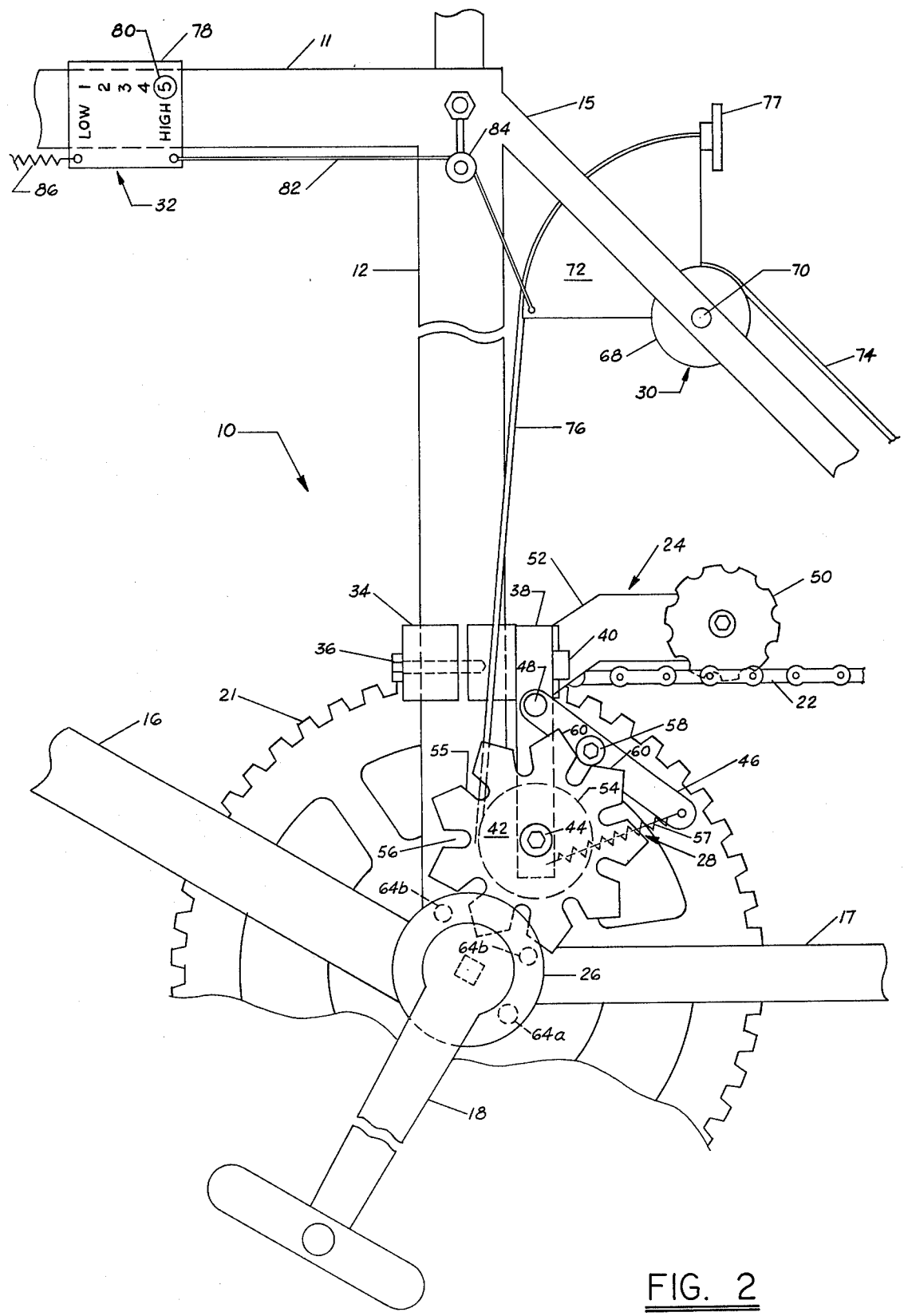
FIG. 2 is an enlarged side elevation view of a portion of a bicycle incorporating the invention.
Figure 3:
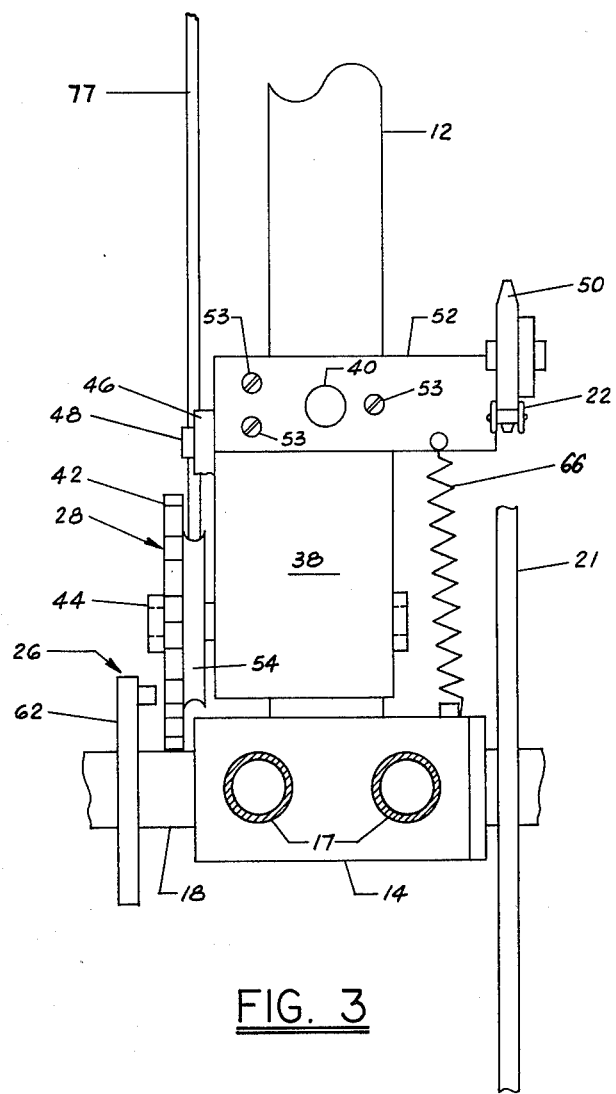
FIG. 3 is a rear elevation view, with parts removed for clarity, of a portion of the invention.

Referring now to the drawings where the illustrations are for the purpose of describing the preferred embodiment of the present invention and are not intended to limit the invention hereto, FIGS. 1, 2 and 3 illustrate a bicycle 10 having a frame and including a top tube 11, a seat tube 12 welded to the top tube 11, a crank housing 14 to which the lower end of the seat tube 12 is welded, seat stays 15 welded to the upper portion of the seat tube 12, a down tube 16 welded to the crank housing 14, chain stays 17 connected between the crank housing 14 and the seat stays 15, a crank 18 received within the crank housing 14, a rear wheel 19, a derailleur mechanism 20 with a free wheel gear cluster 20a on the rear wheel 19, a drive sprocket 21 attached to the crank 18, a drive chain 22 received over the drive sprocket 21 and the rear derailleur 20 and the shift mechanism of the invention designated generally by the numeral 24.

The shift mechanism 24 comprises a drive wheel 26 attached to the crank 18, a driven wheel assembly 28 mounted on the seat tube 12, a transfer device in the form of a ratio wheel assembly 30 pivotally mounted on a seat stay 15, and a gear indicator assembly 32 slideably received on the top tube 11.

The driven wheel assembly 28 comprises a support clamp 34 which is of split construction and is held in clamping relation to the seat tube 12 by means of a bolt 36, a pivot block 38 mounted for pivotal movement on the clamp 34 by means of a pivot pin 40 and extending downward therefrom, a generally gear-shaped driven wheel 42 mounted for rotation on the pivot block 38 by means of a shouldered bolt 44, a locator arm 46 pivotally attached to the pivot block 38 by means of a pin 48 and engageable with the driven wheel 42, drive chain engageable means comprising an idler sprocket 50 which is pivotally mounted on a bracket 52 attached to the pivot block 38 by means of screws 53 and which rides on the top of drive chain 22, and a pulley 54 attached to the driven wheel 42 for rotation therewith.

The driven wheel 42 comprises a plurality of tooth-like projections 55 separated by slots 56. The shape and number of the tooth-like configurations 55 can vary so as to limit the number of possible engagements with the actuator pins 64a and 64b. The locator arm 46 is pivoted at one end at 48 as described above and has an extension spring 57 attached to the opposite end thereof and to the pivot block 38 to bias the arm in a clockwise direction as viewed in FIG. 2. Centrally located on the locator arms 46 is a locator roller 58 which engages ramp surfaces 60 formed on the ends of projections 55. The ramps angle downward as shown toward the adjacent slots 56, the slots being somewhat narrower than the diameter of roller 58 so that under the force of spring 57 the action of the roller on a ramp tends to rotate the wheel 42 slightly until the roller becomes centered in a slot 56.

The drive wheel 26 comprises a disc 62 attached to the crank 18 for rotation therewith and a forward actuation pin 64a and a pair of reverse actuator pins 64b fixed to the disc and extending inwardly therefrom toward the driven wheel 42 for engagement with the slots 56, as will be described later. The number and location of the actuator pins 64a, 64b are subject to individual preference.

The idler sprocket bracket 52 is offset from the pivot block 38 to align the idler sprocket 50 with the driven chain 22, and an extension spring 66 extends between the bracket 52 and the crank housing 14 to bias the pivot block clockwise as viewed in FIG. 3 about pivot pin 40 and tends to maintain the driven wheel 42 in engagement with the drive wheel 26. When pressure is maintained on the pedals, the tension in the drive chain 22 acts upwardly on the idler sprocket 50 to rotate the pivot block 38 counterclockwise as viewed in FIG. 3 against the force of spring 66 to maintain the driven wheel 42 out of engagement with the drive wheel 26.

The ratio wheel assembly 30 comprises a pulley 68 pivotally mounted on a pin 70 extending through a seat stay 15, and a segment pulley 72, which in the illustrated embodiment is a quadrant of a circle having a diameter greater than that of pulley 68 and which can be formed integral with the pulley 68 or fixed thereto. A first cable 74 which actuates the rear derailleur 20 is received over the pulley 68 and is fastened thereto. In accordance with the invention, the rear derailleur operates as it would under conventional manual control, the cable 74 being biased by the mechanism to move down and to the right to shift from a lower speed to a higher speed and up and to the left by an actuating force applied thereto, to shift from a higher speed to a lower speed.

A second cable or chain 76 is received over the segment pulley 72 and is fastened thereto and extends downward where it is received over and is fastened to the pulley wheel 54. To provide fine adjustment of the chain 76, it can be attached to the segment wheel 72 by means of a convenient form of adjusting screw mechanism 77 which, by turning same, can effectively shorten or lengthen the cable or chain 76.

The speed indicator assembly 32 can take a number of forms, however, in the preferred embodiment it comprises a clear plastic tube which surrounds the top tube 11 and is connected to the segment pulley 72 to move along the top tube 11 as the segment pulley 72 moves. A decal or the like with numbers or other identifying indicia corresponding to the available speeds of the rear derailleur is attached to the top tube 11, and an indicator mark such as circle 80 is formed on the indicator tube in position to line up with the numbers on the top tube. A cable or chain 82 extends from one end of the indicator tube 78, over a small idler pulley 84 pivotally mounted on the seat tube 12 and to the segment pulley 72. An extension spring 86 extends between the indicator tube 78 and a convenient point (not shown) on the top tube to bias the indicator tube 78 toward the high speed position shown.

OPERATION

In the normal operation of the bicycle at a given speed, the tension in the drive chain 22 due to normal pedal pressure acts on the idler sprocket 50 to rotate the pivot block 38 counterclockwise, and thus move the driven wheel 42 out of engagement with the drive wheel 26 and thus out of position for the pins 64 to enter the slots 56. When it is desired to shift the rear derailleur to a higher speed, pedal pressure is reduced permitting the spring 66 to rotate the pivot block 38 clockwise, moving the driven wheel 42 into engagement with the drive wheel 26, and allowing pins 64a to enter the slot 56. As pedaling continues, the pin 64a acts on the driven wheel 42 to rotate it clockwise as viewed in FIG. 2, allowing the segment pulley 72 to rotate clockwise by movement of the connecting chain 76, thus allowing the ratio wheel 30 to rotate clockwise to let the derailleur cable 74 move to the right to move the drive chain 22 onto a higher speed sprocket wheel 20a in accordance with the normal operation of the derailleur mechanism. Once tension is restored in the drive chain, the driven wheel 42 is again rotated out of engagement with the drive wheel 26 by the action of the chain 22 on the idler sprocket 50. Additional changes to higher speeds are made in the same manner, being limited only by the number of changes available on the rear derailleur.

When the driven wheel 42 rotates, the locator roller 58 is forced out of position centered in a slot 56 and moves to the next position and automatically centers itself in the center of the next slot to maintain the driven pulley 42 in that position. As the segment wheel 72 rotates clockwise, the indicator tube 78 moves to the left to indicate the higher speed.

When it is desired to shift to a lower speed, the pedals are stopped in a position to put one of the reverse actuator pins 64b in position to engage a slot 56 and the pedals are rotated approximately backward ⅛ turn (in the illustrated embodiment) thus rotating the driven wheel 42 counterclockwise as shown and moving the derailleur cable to the left through the action of chain 76, the segment pulley 72 and the ratio wheel 30 to position the derailleur for a shift to a lower speed. When the pedals are rotated forward again approximately ¼ turn, the chain 22 moves onto the next lower sprocket and chain tension causes the driven wheel 42 to move out of engagement with the drive wheel 26 as described above.

To downshift two speeds, the pedals can be rotated approximately ¼ turn causing the second reverse actuator pin to move the driven wheel 42 an extra ⅛ turn to effect a two speed downshift.

Figure 4A:
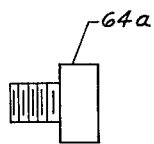
FIGS. 4A and 4B are enlarged elevation views of two forms of drive pins used in the invention.
Figure 4B:
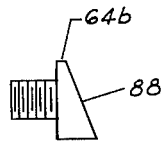

Referring to FIGS. 4A and 4B it can be seen that the forward actuator pin 64a defines a full cylinder as shown, while the reverse pins 64b are formed with an angled surface 88 and are positioned in the drive wheel 26 so that they can engage a side of a slot 56 to rotate the driven wheel 42 only when the pedals are rotated backwards, the surface 88 merely sliding over the driven wheel 42 in the forward direction.

It can be appreciated that the illustrative embodiment depicts a bicycle having a five speed derailleur, and that for derailleurs having additional speeds, the relative sizes and configurations of components such as the driven wheel, the drive wheel and the ratio and segment wheels will change, however, the principle of operation will remain the same.

To facilitate description of the present invention, it has been illustrated herein as applied to a bicycle having a rear derailleur mechanism only. It is contemplated that the invention will also be used on bicycles which include a forward derailleur mechanism associated with the drive sprocket 21. Since the most commonly used front derailleur mechanism has only two positions, shifting of the front derailleur does not require the precise positioning required by the conventional rear derailleur and thus can easily be used in conjunction with the shifting mechanism of the invention to provide a full complement of speed changes.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. In a bicycle comprising a frame; a crank mechanism rotatable within said frame; a drive sprocket attached to said crank mechanism for rotation therewith; a drive chain entrained around said drive sprocket, at least a portion of said drive chain being under tension when a driving force is applied to said crank mechanism and slack when no driving force is applied thereto; first cable means for effecting speed changes of said bicycle; and apparatus for moving said first cable means to a plurality of positions, said apparatus comprising drive means mounted on said crank mechanism for rotation therewith, driven means mounted on said frame for movement between a first position in engagement with said drive means for rotation therewith and a second position out of engagement with said drive means, spring means biasing said driven means into said first position, means connecting said driven means to said first cable means for linear movement of said first cable means with rotation of said driven means, and means connected to said driven means and engageable with said portion of said drive chain to move said driven means to said second position when said portion of said drive chain is in tension.

2. The apparatus as defined in claim 1, wherein said driven means comprises a driven wheel, said drive means includes means therein engageable with said driven wheel when said driven means is in said first position whereby said driven wheel is rotated by rotation of said crank mechanism, and said means connecting said driven means to said linear actuating means comprises second cable means attached to said driven wheel, and transfer means mounted on said frame remote from said driven means and operable to transfer linear movement of said second cable means to linear movement of said first cable means.

3. The apparatus as defined in claim 2, in which said transfer means comprises first pulley means mounted for rotation on said frame, said first cable means being attached to and windable around said first pulley means; and second pulley means coaxial with and rotatable with said first pulley means, said second cable means being attached to and windable around said second pulley means.

4. The apparatus as defined in claim 3, in which said first and second pulley means are of different diameters whereby movement of said first cable means through a first distance produces movement of said second cable means through a second distance.

5. The apparatus as defined in claim 4, including means for adjusting said second cable means, said adjusting means being attached to said second pulley means and being operable to vary the length of said second cable means.

6. The apparatus as defined in claims 2, 3 or 4, including a block pivotally mounted on said frame for rotation about an axis perpendicular to the axis of rotation of said crank mechanism, means mounting said driven wheel on said block for rotation about an axis parallel to the axis of rotation of said crank mechanism, and means mounting said drive chain engageable means on said block for pivotal movement therewith.

7. The apparatus as defined in claim 6, in which said means biasing said driven wheel into said first position comprises a spring acting between said block and said frame, and said drive chain engageable means comprises an idler sprocket.

8. The apparatus as defined in claim 6, in which said driven wheel includes a plurality of slots spaced around the circumference thereof, and said drive member comprises a disc coaxial with said crank means, and a plurality of pins extending from said disc toward said driven wheel and engageable with said slots.

9. The apparatus as defined in claim 8, including means engageable with said driven wheel to maintain said driven wheel in the position it is in after said driven means is moved to its second position.

10. The apparatus as defined in claim 9, in which said driven wheel includes a plurality of outwardly extending projections formed thereon between said slots and having ramp surfaces thereon angled downward toward said slots, and said means operable to maintain the position of said driven wheel comprises an arm pivotally mounted at one end to said block, a roller mounted for rotation on said arm in position to engage said driven wheel, and means acting on said arm to bias said roller into engagement with said driven wheel, the diameter of said roller being greater than the width of said slots, whereby engagement of said roller with any of said ramp surfaces is operable to rotate said driven wheel until said roller becomes centered within the opening of an adjacent slot.

11. The apparatus as defined in claim 10, in which said means acting on said arm to bias said roller comprises an extension spring acting between said arm and said block.

12. The apparatus as defined in claim 4, including indicator means connected to said first cable means to provide a visual indication of the position of said second cable means.

13. The apparatus as defined in claim 12, in which said indicator means comprises an indicator member having position identifying indicia thereon and mounted for linear movement relative to said frame, a spring attached to said indicator member to bias said indicator member to a first position, and third cable means attached at one end to said indicator member and at the other end to said first pulley means.

* * * * *